(12) United States Patent
Yoo et al.

(10) Patent No.: US 11,993,056 B2
(45) Date of Patent: May 28, 2024

(54) METAL-PLASTIC COMPOSITE MATERIAL AND METHOD FOR MANUFACTURING SAME

(71) Applicant: POSCO, Pohang-si (KR)

(72) Inventors: Hye-Jin Yoo, Gwangyang-si (KR);
Chang-Se Byeon, Gwangyang-si (KR);
Jung-Su Kim, Gwangyang-si (KR);
Je-Hoon Baek, Gwangyang-si (KR);
Hwi-Geon Kim, Incheon (KR)

(73) Assignee: POSCO, Pohang-si (KR)

( * ) Notice: Subject to any disclaimer, the term of this patent is extended or adjusted under 35 U.S.C. 154(b) by 1 day.

(21) Appl. No.: 17/782,958

(22) PCT Filed: Dec. 9, 2020

(86) PCT No.: PCT/KR2020/017822
§ 371 (c)(1),
(2) Date: Jun. 6, 2022

(87) PCT Pub. No.: WO2021/118196
PCT Pub. Date: Jun. 17, 2021

(65) Prior Publication Data
US 2023/0016611 A1 Jan. 19, 2023

(30) Foreign Application Priority Data
Dec. 11, 2019 (KR) .................. 10-2019-0164956

(51) Int. Cl.
*B32B 15/08* (2006.01)
*B32B 7/10* (2006.01)
(Continued)

(52) U.S. Cl.
CPC ............ *B32B 15/08* (2013.01); *B32B 7/10* (2013.01); *B32B 15/18* (2013.01); *C08K 5/5415* (2013.01);
(Continued)

(58) Field of Classification Search
None
See application file for complete search history.

(56) References Cited

U.S. PATENT DOCUMENTS

2003/0162049 A1    8/2003  Kroes et al.
2004/0028937 A1*   2/2004  Egashira ............... B32B 15/08
                                              428/626

(Continued)

FOREIGN PATENT DOCUMENTS

CN    101535043 A      9/2009
CN    109054665 A  *  12/2018  .............. C08L 23/08

(Continued)

OTHER PUBLICATIONS

Tsugawa—JP S62-48542 A—IDS—MT—metal-polymer w-silane joining layers—1987 (Year: 1987).*

(Continued)

*Primary Examiner* — John Vincent Lawler
(74) *Attorney, Agent, or Firm* — Morgan, Lewis & Bockius LLP

(57) ABSTRACT

The present invention provides a metal-plastic composite material having excellent adhesive strength and formability and a method for manufacturing the same, and specifically, the present invention provides a metal-plastic composite material and a method for manufacturing the same comprising: a metal layer; and a plastic layer on at least one surface of the metal layer, wherein a thin film layer formed of a silane coupling agent is provided between the metal layer and the plastic layer, and the metal layer and the plastic layer are bonded by covalent bonding with the silane coupling agent.

12 Claims, 4 Drawing Sheets

(51) Int. Cl.
*B32B 15/18* (2006.01)
*C08K 5/5415* (2006.01)
*C08K 5/544* (2006.01)

(52) U.S. Cl.
CPC .......... *C08K 5/544* (2013.01); *B32B 2250/03* (2013.01); *B32B 2250/40* (2013.01); *B32B 2255/06* (2013.01); *B32B 2307/732* (2013.01); *B32B 2309/02* (2013.01); *B32B 2309/12* (2013.01); *B32B 2311/30* (2013.01); *B32B 2605/08* (2013.01)

(56) References Cited

U.S. PATENT DOCUMENTS

| | | | | |
|---|---|---|---|---|
| 2005/0153157 | A1* | 7/2005 | Matsubayashi | C22C 38/10 428/626 |
| 2005/0214553 | A1* | 9/2005 | Yannetti | B32B 27/32 428/461 |
| 2010/0236690 | A1* | 9/2010 | Kawaguchi | H05K 3/389 156/64 |
| 2010/0323208 | A1* | 12/2010 | Song | B32B 15/08 428/447 |
| 2012/0064354 | A1* | 3/2012 | Fujita | B05D 7/54 427/386 |
| 2018/0216235 | A1* | 8/2018 | Takahashi | B32B 15/043 |
| 2018/0281349 | A1 | 10/2018 | Cho et al. | |
| 2021/0078291 | A1 | 3/2021 | Yoo et al. | |

FOREIGN PATENT DOCUMENTS

| | | | | |
|---|---|---|---|---|
| EP | 3663075 | A1 | 6/2020 | |
| EP | 3730287 | A1 | 10/2020 | |
| JP | 62-48542 | A | 3/1987 | |
| JP | S62-48542 | A * | 3/1987 | B32B 15/08 |
| JP | 6-15773 | A | 1/1994 | |
| JP | H06/15773 | A * | 1/1994 | B32B 15/08 |
| JP | 2000-265282 | A | 9/2000 | |
| JP | 2000-265282 | A * | 9/2000 | C23C 22/34 |
| JP | 2002-285354 | A | 10/2002 | |
| JP | 2004-345214 | A | 12/2004 | |
| JP | 2006/043913 | A * | 2/2006 | B32B 15/095 |
| JP | 5663490 | B2 | 2/2015 | |
| JP | 2016-069597 | A | 5/2016 | |
| JP | 2019-25842 | A | 2/2019 | |
| KR | 10-2002-0069018 | A | 8/2002 | |
| KR | 10-2011-0100319 | A | 9/2011 | |
| KR | 2012/0079478 | * | 7/2012 | B32B 15/08 |
| KR | 2012/0079478 | A * | 7/2012 | B32B 15/08 |
| KR | 10-2015-0067301 | A | 6/2015 | |
| KR | 10-2017-0068716 | A | 6/2017 | |
| KR | 10-1755112 | B1 | 7/2017 | |
| KR | 10-2019-0075486 | A | 7/2019 | |
| KR | 10-2019-0076631 | A | 7/2019 | |
| KR | 10-2008972 | B1 | 8/2019 | |
| WO | 2011/052520 | A1 | 5/2011 | |
| WO | WO 2010/131775 | A * | 11/2012 | B05D 7/14 |
| WO | WO2016/133210 | A1 | 12/2017 | |
| WO | WO 2019/026331 | A1 * | 2/2019 | B29C 65/02 |

OTHER PUBLICATIONS

Sakamoto—JP H06-15773 A—Euro D2—MT—metal-plastic w-silane—1994 (Year: 1994).*
Furukawa—JP 2000-265282 A—KR.Rej. D2—MT—silane coupling agent on metal layer—2000 (Year: 2000).*
Nakamoto—JP 2006-043913 A—MT—silane+urethane layer w-thickness—metal-plastic—2006 (Year: 2006).*
Kanai—JPWO 2010-131775 A1—MT—silane layer bonding metal to polymer—2010 (Year: 2010).*
Saito—KR 2012-0079478 A—sister of Euro D1—MT—silane coupling agent bond metal to resin—2012 (Year: 2012).*
Qi—CN 109054665 A—IDS—MT—metal-plastic w-silane coupling 2018 (Year: 2018).*
Kagawa—WO 2019-026331 A1—Euro D3—sis PCT D1—MT—metal-polymer composite w-functional group—2019 (Year: 2019).*
Fisher-Scientific—(3-Aminopropyl)trimethoxysilane, 97%, Fisher Scientific—Oct. 17, 2023 (Year: 2023).*
Huang W., "Silane Coupler and Silicone Resin", Chengdu: Sichuan Science and Technology Press, Aug. 31, 2010, 3 pages total (see English Abstract).
Office Action dated Apr. 20, 2023 for corresponding Japanese Patent Application No. 2022-535092.
Office Action dated Apr. 26, 2023 for corresponding Chinese Patent Application No. 202080086018.1.
4 Search Report dated May 9, 2023 for corresponding European Patent Application No. 20900288.0.
International Search Report dated Apr. 27, 2021 issued in International Patent Application No. PCT/KR2020/017822 (with English translation).

* cited by examiner

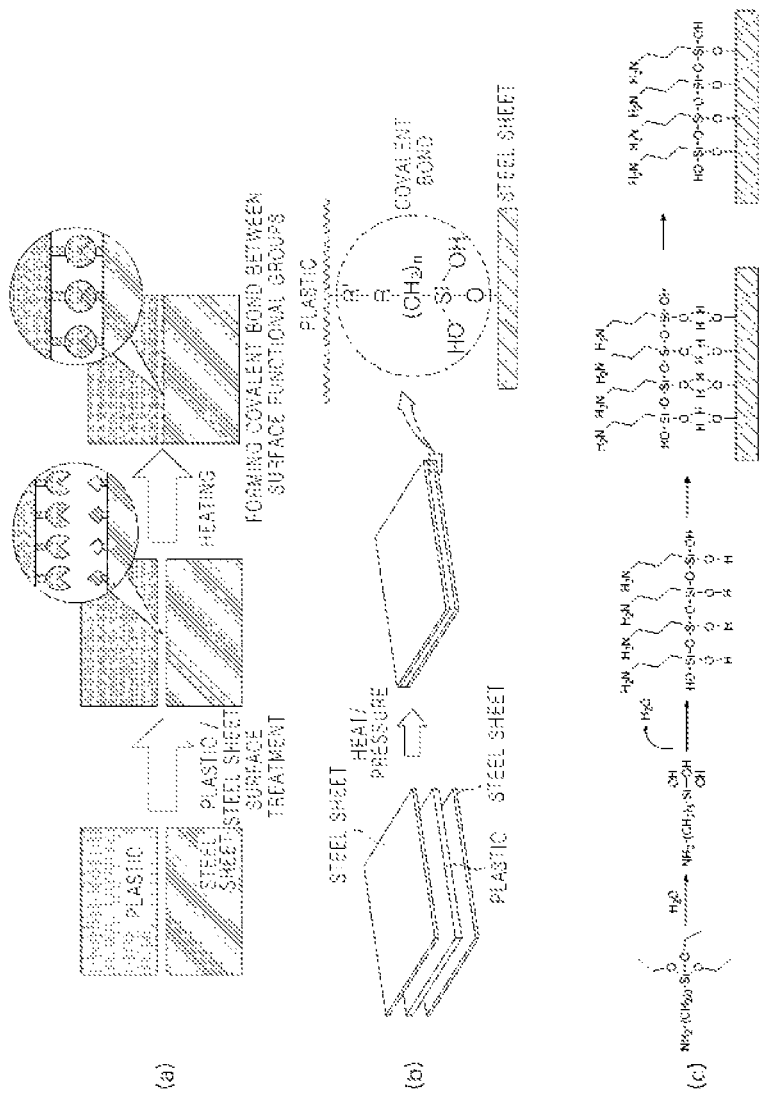
[FIG. 1]

[FIG. 2]
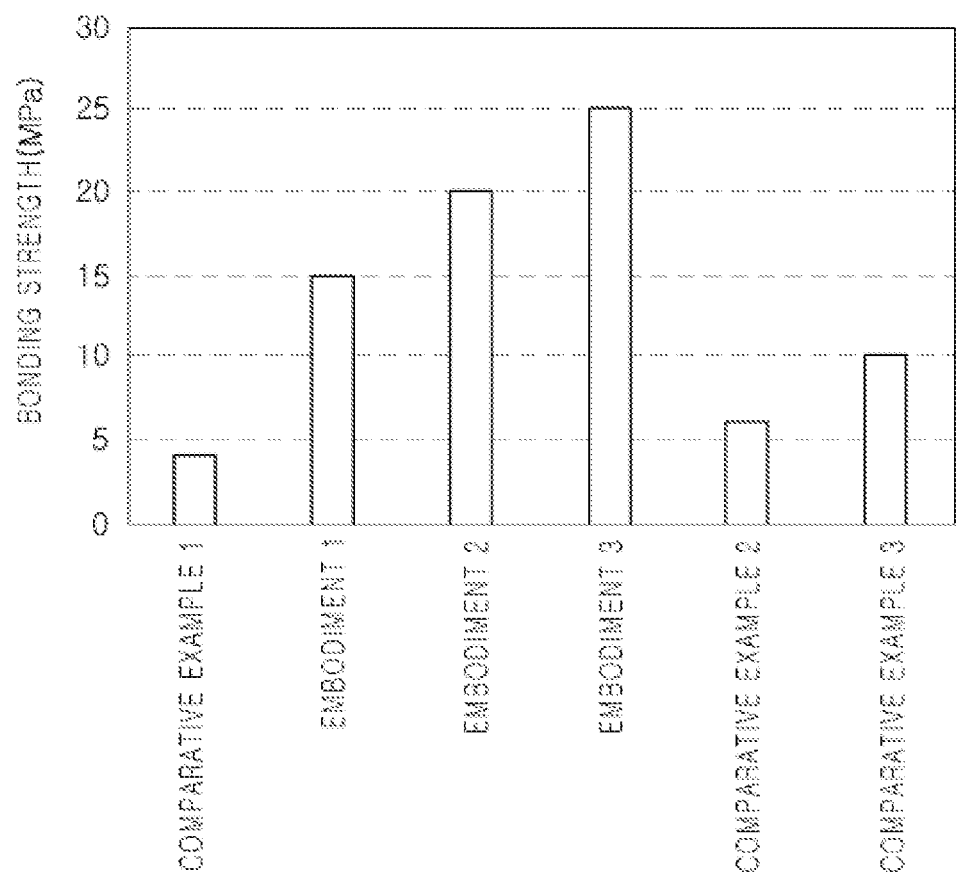

[FIG. 3]
(a)
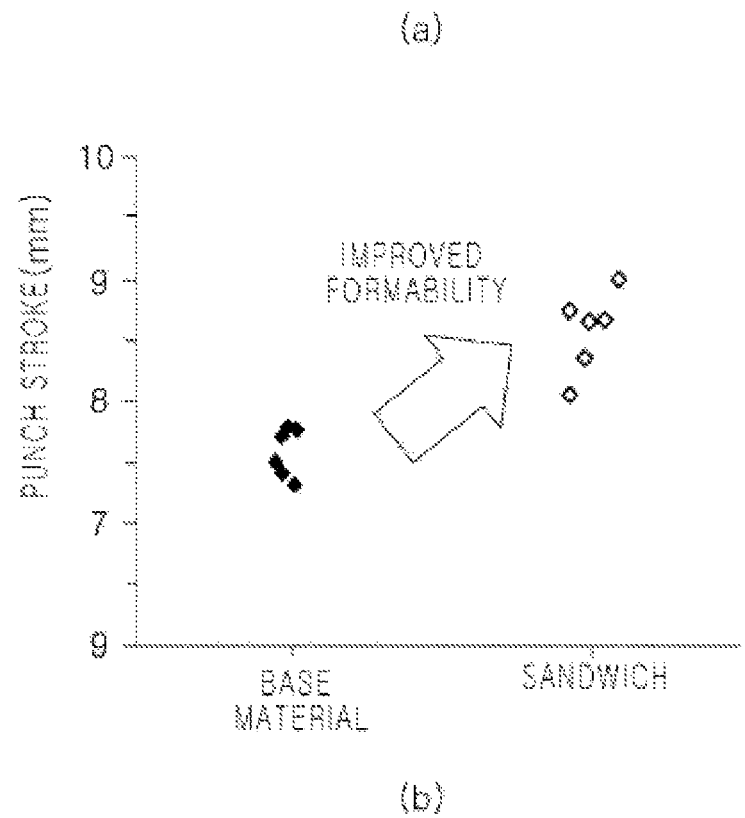
(b)
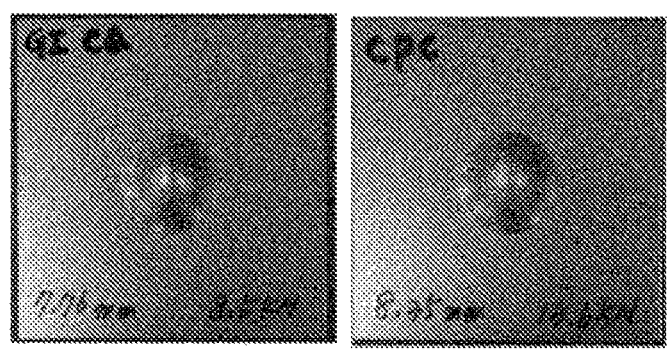

[FIG. 4]
(a)
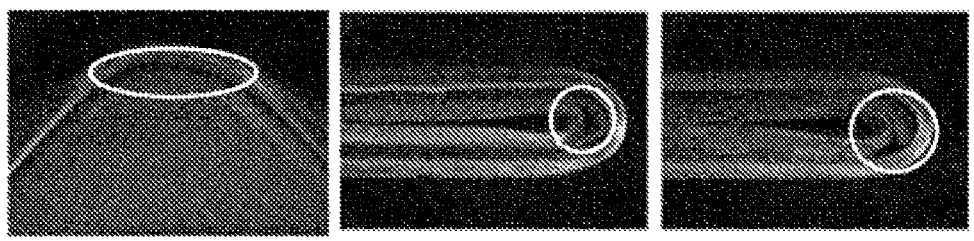
[COMPARATIVE EXAMPLE 3]
(b)
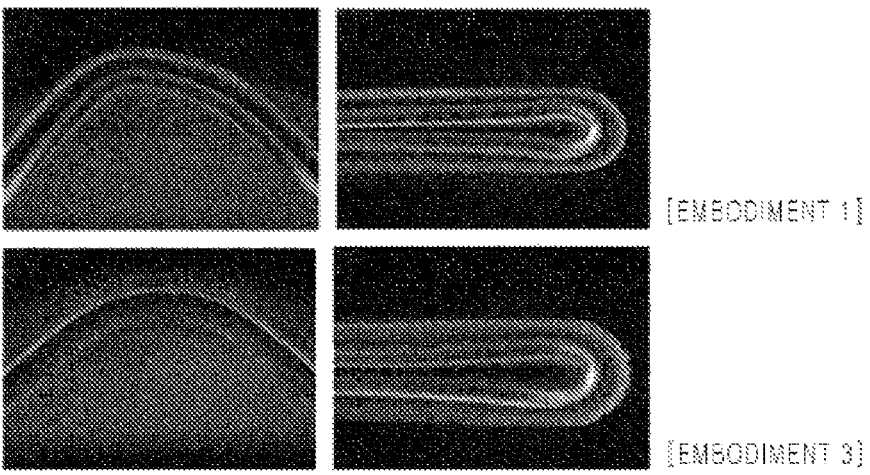
[EMBODIMENT 1]
[EMBODIMENT 3]

METAL-PLASTIC COMPOSITE MATERIAL AND METHOD FOR MANUFACTURING SAME

CROSS-REFERENCE OF RELATED APPLICATIONS

This application is the U.S. National Phase under 35 U.S.C. § 371 of International Patent Application No. PCT/KR2020/017822, filed on Dec. 9, 2020, which in turn claims the benefit of Korean Application No. 10-2019-0164956, filed on Dec. 11, 2019, the entire disclosures of which applications are incorporated by reference herein.

TECHNICAL FIELD

The present disclosure relates to a metal-plastic composite material and a method for manufacturing same.

BACKGROUND ART

Over the past 20 years, the problem of excessive use of energy has become an issue, and there has been an active movement to reduce the weight of materials throughout industry to reduce energy use. Concerns about environmental pollution caused by the serious issue of energy use and depletion of energy resources due to a rapid increase in demand for automobiles have increased. Accordingly, active research into the reduction of weight of materials has been conducted, and the use of lightweight materials such as aluminum has also been increasingly used every year. Particularly, in the automobile industry, reduction of weight of automobile materials has become an important issue and may be a goal of next-generation development for most of automobile companies. World-renowned automobile manufacturers and companies related to parts and materials have been engaged in fierce technological competition with the goal of producing automobiles with high fuel efficiency through the development and adoption of new materials to reduce the weight of automobiles.

Meanwhile, among such lightweight materials, aluminum has been most widely used as an automobile material among non-ferrous materials, and in particular, the ratio applied to exterior panels of an automobile has increased. However, a lot of energy may be consumed in processing aluminum, and there may be a disadvantage in terms of price, which may be problematic.

Accordingly, a thin high-strength steel sheet has emerged as a material corresponding to aluminum. However, when a high-strength steel sheet is used, a thickness may decrease such that stiffness of an external sheet may insufficient, and a high-strength steel sheet of a predetermined thickness or less may have fine wrinkles or springback during processing, which may be limitations. As an alternative thereto, a lightweight sandwich steel sheet in which a light polymer layer having adhesive properties may be inserted between the steel sheets has been studied.

The process of applying an adhesive for bonding a plastic layer to a steel sheet and laminating (see Korean Patent Publication No. 2017-0068716) or the process of performing a plasma-treatment on the surface of the steel sheet and laminating may be performed on the composite steel sheet in which a plastic layer is inserted. The method of applying an adhesive, however, may have a problem in that harmful substances may be created or an interfacial surface may be peeled due to processing or temperature change, and the method of treating plasma on the surface of the steel sheet may have a limitation in that sufficient adhesive strength may not be secured between the plastic layer and the steel sheet.

SUMMARY OF INVENTION

Technical Problem

An aspect of the present disclosure is to provide a metal-plastic composite material having excellent adhesive strength and formability and a method for manufacturing the same.

Solution to Problem

An aspect of the present disclosure provides a metal-plastic composite material including a metal layer; and a plastic layer on at least one surface of the metal layer, wherein a thin film layer formed of a silane coupling agent is provided between the metal layer and the plastic layer, and wherein the metal layer and the plastic layer are bonded to each other by a covalent bond with the silane coupling agent.

Another aspect of the present disclosure provides a method of manufacturing a metal-plastic composite material including forming a thin film layer formed of a silane coupling agent by coating a silane coupling agent on one surface or both surfaces of a metal layer; preparing a metal-plastic laminated material by laminating a plastic layer on the thin film layer; and bonding the metal-plastic laminated material by applying heat and pressure thereto.

Advantageous Effects of Invention

In the present disclosure, since a metal layer and a plastic layer may be covalently bonded, the metal layer and the plastic layer may be bonded with a significantly thinner thickness as compared to using an adhesive, bonding may be performed within a short period of time, volatile organic compounds created when the adhesive is used, and a constant and excellent bonding strength may be secured. Furthermore, phenomena such as fine wrinkles or springback occurring during processing may be prevented, and also, deterioration caused by the surrounding environment may not occur, and bonding force with the steel sheet may be strengthened regardless of the type/properties of the plastic.

BRIEF DESCRIPTION OF DRAWINGS

FIG. 1(A) illustrates an example in which a plastic layer and a metal layer may be bonded by a covalent bond according to the present disclosure, FIG. 1(B) illustrates an example of a covalent bond formed between the plastic layer and the metal layer, and FIG. 1(C) illustrates an example of a covalent bond formed by a silane coupling agent.

FIG. 2 illustrates results of measuring bonding strength of a composite material prepared according to an Example of the present disclosure.

FIG. 3 illustrates results of measuring formability of a composite material prepared according to an Example of the present disclosure.

FIG. 4 is images of a bonding interfacial surface of composite materials during processing, prepared in Examples 1 and 3 and comparative example 3.

BEST MODE FOR INVENTION

Hereinafter, refer to the attached drawings, preferable embodiment of steel material of the present disclosure will be described. Embodiments of the present disclosure may be modified to have various other forms, and the scope of the present disclosure is not limited to the embodiments described below.

Generally, when manufacturing a sandwich steel sheet, in the case of metal and plastic are bonded with an adhesive, metal and plastic may be bonded by a non-covalent bond such as a van der Waals bond or a hydrogen bond, and bonding strength of the sandwich steel sheet may be weak and irregular. Also, since an adhesive is used, a thickness of the adhesive layer may be excessively thick, tens of μm, and the time required for bonding may also increase. Furthermore, during bonding, volatile organic compounds may be created by the components of the adhesive, or deterioration may be caused by the surrounding environment (humidity, heat, acid atmosphere, or the like), and accordingly, an adhesive may need to be selected depending on the metal and plastic, and thorough quality control may also be required, which may be problematic.

Furthermore, a method of manufacturing a sandwich steel sheet by laminating a plastic after performing plasma treatment on the surface of the metal may be used, but the above method may have a limitation in that sufficient adhesive strength may not be secured between the plastic and the metal.

Accordingly, the present inventors studied a structure for obtaining a remarkably excellent bonding force when bonding metal and plastic, and as a result, it is confirmed that, when bonding metal and plastic by a covalent bond (FIG. 1(A)), the bonding strength, the thickness of the adhesive layer, and the time required for bonding described above may could all improve, which may be advantages.

Accordingly, the present disclosure provides a metal-plastic composite material having excellent adhesive strength and formability and a method for manufacturing the same through molecular bonding (or covalent bonding) between metal and plastic.

Specifically, the present disclosure provides a metal-plastic composite material including a metal layer; and a plastic layer on at least one surface of the metal layer, wherein a thin film layer formed of a silane coupling agent is provided between the metal layer and the plastic layer, and the metal layer and the plastic layer are bonded to each other by a covalent bond with the silane coupling agent.

Further, the present disclosure provides a method of manufacturing a metal-plastic composite material including forming a thin film layer formed of a silane coupling agent by coating a silane coupling agent on one or both surfaces of a metal layer; preparing a metal-plastic laminated material by laminating a plastic layer on the thin film layer; and bonding by applying heat and pressure to the metal-plastic laminated material.

More specifically, the metal layer and the plastic layer used in the metal-plastic composite material of the present disclosure will be described.

As the material of the metal layer, a metal generally used for a metal-plastic composite material may be used without limitation. Preferably, a plated steel sheet having functional groups formed on the metal surface may be used.

Therefore, in the metal-plastic composite material in the present disclosure, the functional group formed on the metal surface may form a covalent bond with the silane coupling agent, and also, the silane coupling agent may form a covalent bond with the plastic, such that the metal-plastic composite material may be formed (FIG. 1(B)).

Further, the thickness of the metal layer may be, for example, 0.2 to 1.2 mm, but an embodiment thereof is not limited thereto.

Meanwhile, the metal-plastic composite material of the present disclosure may use plastic for weight reduction, and the plastic may be sandwiched between a metal layer and a metal layer, or may be used in a state of being bonded to one metal layer.

For example, the metal-plastic composite material of the present disclosure may have a dual-layer structure of a metal layer/plastic layer, a sandwich-type triple-layer structure such as a metal layer/plastic layer/metal layer and a plastic layer/metal layer/plastic layer, and a metal layer may be formed on both surfaces of the plastic layer, and also, the metal-plastic composite material may have various laminated structures.

Engineering plastic may be used as a material of the plastic layer, but an embodiment thereof is not limited thereto. Engineering plastic may refer to high-strength plastic used as industrial materials or structural materials. Engineering plastic may be distinguished from general plastics formed of low molecular weight materials of several tens to hundreds in that engineering plastic may be formed of high molecular weight materials in the range of several hundred thousand to several million.

The performance and characteristics of engineering plastic may vary depending on their chemical structure, but in the present disclosure, engineering plastic may bond metal and plastic through a covalent bond, and any plastic may be used without limitation. For example, the plastic layer may include one or more polymers selected from a group consisting of polyamide, polyacetyl, polycarbonate, polyphenylene oxide, polyethylene, polypropylene, polyester and polyurethane. Also, polybutylene terephthalate, which is one of polyesters, may be used.

The thickness of the plastic layer may be, for example, 0.2 to 1.2 mm, but an embodiment thereof is not limited thereto.

Meanwhile, a ratio of the thickness between the plastic layer and the metal layer of the present disclosure may be 3:1 to 1:5, preferably 2:1 to 1:2, and the total thickness of the composite material may be 0.4 to 3.6 mm. In the above range, rigidity and weight reduction of the metal-plastic composite material may be simultaneously implemented, but an embodiment thereof is not limited thereto, and the thickness ratio may be adjusted if desired.

Furthermore, in the present disclosure, a thin film layer formed of a silane coupling agent may be included to covalently bond the plastic layer and the metal layer as described above. In this case, the silane coupling agent may form a covalent bond with the functional group formed on the metal layer, and simultaneously, the silane coupling agent may form a covalent bond with the plastic layer.

The functional group is not limited to any particular example as long as the functional group may form a covalent bond with the silane coupling agent, and for example, the functional group may be at least one functional group selected from a group consisting of an amine group, a vinyl group, a carboxy group, a carbonyl group, an alkoxy group and a hydroxyl group.

For example, a hydroxyl group may be formed on the metal surface by degreasing, oxidation, or the like, of the metal surface. Basically, silane may be an inorganic material having bonding strength with a steel sheet, and covalent bonding may be formed between the metal and the silane coupling agent by treating the metal with a silane coupling agent.

Further, the thin film layer may have a thickness of several nm to several hundred nm, and may be 1 nm or more to less than 1000 nm, and for example, the thin film layer may be a thin film layer formed by applying a silane coupling agent to the surface of the metal layer at 50-200 mg/m$^2$. This may be possible because the thin film layer forms a layer close to a single molecule, and accordingly, the above thickness may be obtained, thereby minimizing the interfacial surface between the composite material and reducing the peeling phenomenon of the portion in which the metal and the plastic are bonded during processing.

Furthermore, the silane coupling agent may form a covalent bond with the metal layer and the plastic, respectively, and a silane coupling agent having an ethoxy group, an amine group, or the like, or a trifunctional or tetrafunctional silane coupling agent may be used (FIG. 1(C)). For example, as the silane coupling agent, 3-glycidoxy propyl trimethoxy silane having a methoxy or ethoxy group capable of reacting with a hydroxyl group, 6-[[3-(triethoxysilyl)propyl]amino]-1,3,5-triazine-2,4-dithiol monosodium (TES), 3-Acryloxy propyl trimethoxy silane, 3-amino propyl triethoxy silane, or tetramethoxy silane may be used, but an embodiment thereof is not limited thereto.

Meanwhile, the thin film layer may include a small amount of a polyurethane-based resin or a phenoxy-based resin for stronger bonding strength. However, since it is difficult to form a covalent bond with the metal layer and the plastic layer, the resin may be used in a small amount as compared to the silane coupling agent preferably. For example, based on a total weight of the thin film layer, the silane coupling agent may be included by 95 to 99 weight %, and the polyurethane-based resin or polyphenoxy-based resin may be included by 1 to 5 weight %.

Further, to secure corrosion resistance, chemical resistance, or the like, of the metal-plastic composite material, hydrogen hexafluorozirconate (IV), oxalic acid, tannic acid, organic Ti chelate, antifoaming agent, and wetting agent may be further included. However, the component may be included to the extent that the component does not interfere with the covalent bonding of the silane coupling agent preferably. For example, the component may be included in an amount of 1 to 5 weight % based on the total weight of the thin film layer.

Further, the covalent bond may be formed by a functional group formed on the surface of the metal layer, a silane coupling agent, and the silane coupling agent and the plastic layer, and the covalent bond may be any bond, such as, for example, carbon-carbon bond, siloxane bond, amide bond, ester bond, or ether bond, but an embodiment thereof is not limited thereto.

In this case, the covalent bond as described above may be formed when the metal-plastic laminate material is bonded by applying heat and pressure, and the covalent bond between the silane coupling agent and the metal layer and the silane coupling agent and the plastic layer may be formed by applying heat and pressure to the metal-plastic laminate material.

The heat and pressure may be applied in a hot press, but an embodiment thereof is not limited thereto, and may vary depending on a melting point of the polymer material to be bonded. In consideration of the melting point of the plastic used in the metal-plastic composite material, which may be generally manufactured by the thermal fusion method, the above process may be performed at a temperature of 80 to 280° C. When the temperature is lower than the above temperature, thermal fusion may not occur, and when the temperature exceeds the above temperature, the plastic to be fused may be melted and properties of the plastic may be deformed.

Meanwhile, when bonding metal and plastic with an adhesive, it may be difficult to find an adhesive which may bond metal and plastic simultaneously. Also, since bonding is performed in the structure as "metal-adhesive-plastic," the number of interfacial surfaces may increase, and peeling may easily occur on the bonding surface while processing the manufactured composite material, which may be problematic. However, this problem may be addressed by metal-plastic bonding through a covalent bond as in the present disclosure.

Also, to form unevenness on the surface of a metal by roll or chemical/electrochemical etching and to provide a bonding effect between the unevenness and the plastic, it may be difficult to form the unevenness uniformly. Furthermore, the plastic may need to be melted, to flow between the uneven portions and to exhibit a bonding effect, but there may be a limitation in defining an optimal unevenness structure because rheological properties may differ depending on the type of plastic. Differently from the above example, in the present disclosure, a metal and a plastic may be bonded through a covalent bond regardless of the type of plastic, the above limitations may be exceeded.

Also, when the plastic is modified to give a chemical functional group and bonding to a metal is performed, a polar functional group may be introduced into the surface of the plastic layer through UV treatment, ozone treatment, radical reaction, graft reaction, and crosslinking agent treatment. However, this process may be complicated or may take a significant amount time, and further, a crosslinking agent may be necessary to have bonding strength with the steel sheet. Also, it may be difficult to uniformly introduce a polar functional group through the modification of the plastic, which may be problematic. However, in the present disclosure, a metal and a plastic may be bonded through a covalent bond, it may not be necessary to introduce a polar functional group into the plastic as described above.

Hereinafter, the present disclosure will be described in greater detail through specific examples. The examples as below are only examples to help the understanding of the present disclosure, and the scope of the present disclosure is not limited thereto.

MODE FOR INVENTION

Example

Example 1

As a metal layer, a two hot-dip galvanized steel sheet was used (the steel was cut into a thin plate having a width of 150 mm, a length of 120 mm, and a thickness of 0.3 mm, was washed with distilled water and was dried), and a plastic layer (having a width of 150 mm, a length of 50 mm, and a thickness of 1 mm) formed of nylon 6 was used.

To form a functional group on the surface of the metal layer, an aqueous solution of a silane coupling agent was applied to the metal layer through bar coating and was cured at 80 to 120° C. Thereafter the layer was laminated in a metal-plastic-metal three-layer structure (a plastic layer was placed on a surface-treated steel sheet and was laminated such that the surface-treated steel sheet was in contact with the plastic again) and was bonded at 180° C. using a hot press.

In this case, an aqueous solution of a silane coupling agent including 2.5 g of tetramethoxysilane and 4.5 g of 3-aminopropyltriethoxysilane per 100 g of water was applied in an amount of 50 to 300 mg/m$^2$, and accordingly, a thin film layer having a thickness of less than 1 μm was formed on the surface of the metal layer.

Thereafter, the plastic layer was placed between the metal layers so as to be in contact with the thin film layer formed on the two metal layers, was pressurized and heated using a hot press, thereby preparing a metal-plastic composite material.

Examples 2 and 3

The metal-plastic composite material was prepared in the same manner as in Example 1, other than the content of the silane coupling agent to be 1.5 times the weight (Example 2) and twice the weight (Example 3) compared to Example 1.

Comparative Example 1

In Example 1, the metal-plastic composite material was prepared in the same manner as in Example 1, other than not using the silane coupling agent aqueous solution.

Comparative Example 2

The electroplated steel sheet was cut into a thin plate having a width of 150 mm, a length of 120 mm, and a thickness of 0.3 mm, was washed with distilled water and was dried, and a 60-250 g/L NaOH solution was used as an electrolyte, and electrolytic etching was performed with an applied voltage of 5 to 2 V and an applied time of 10 to 30 minutes, thereby physically etching the electroplated steel sheet.

The etched metal described above and a plastic layer including nylon 6 were laminated (a plastic layer was placed on a surface-treated steel sheet and was laminated such that the surface-treated steel sheet was in contact with the plastic again) in a metal-plastic-metal three-layer structure, and bonding was performed at 180° C. using a hot press.

Comparative Example 3

In Example 1, the metal-plastic composite material was prepared in the same manner as in Example 1, other than a thin film layer having a thickness of 1 μm was formed using a commercially available urethane-based adhesive as an adhesive.

Experimental Example

Bonding strength, formability and bending workability of the metal-plastic composite materials prepared in Examples 1 to 3 and comparative examples 1 to 3 were measured.

[Measurement of Bonding Strength]

Bond strength was measured through a general lap shear test (Lap. shear test, ASTM D 1002).

As a result, as illustrated in FIG. 2, it was confirmed that the metal-plastic composite materials in Examples 1 to 3 exhibited at least 1.5 times the adhesive strength as compared to the metal-plastic composite materials in comparative examples 1 to 3.

[Measurement of Moldability]

To measure formability of the metal-plastic composite material, Ericsson evaluation was performed.

Specifically, while changing the punch stroke, formability of the metal-plastic composite in Example 1 and the hot-dip plated steel sheet having the same thickness as that of the metal-plastic composite was measured.

As a result, as illustrated in FIG. 3, it was confirmed that, even when force of the punch stroke increased, as compared to the forming of a material formed only of a hot-dip galvanized steel sheet, the metal-plastic composite material in Example 1 does not burst by the punch stroke and obtained more improved formability. In FIG. 3, GI CQ indicates a material formed of only the hot-dip galvanized steel sheet, and CPC indicates the metal-plastic composite material in Example 1.

[Bending Processability Measurement]

It was observed whether the plastic and the steel sheet were peeled off after the metal-plastic composite material in comparative example 3 was bent by 180° using a VISE.

As illustrated in FIG. 4(a), it was confirmed that, when the metal-plastic composite material prepared in comparative example 3 was bent, the interfacial surface of the composite material was peeled due to poor bonding strength.

Differently from the above example, as illustrated in FIG. 4(b), it was confirmed that the composite materials in Examples 1 and 3 had excellent bonding strength during bending, such that the interfacial surface of the composite material was not peeled off.

While the Examples have been illustrated and described above, it will be apparent to those skilled in the art that modifications and variations could be made without departing from the scope of the present disclosure as defined by the appended claims.

The invention claimed is:

1. A metal-plastic composite material, comprising:
   a metal layer;
   a plastic layer on at least one surface of the metal layer; and
   a thin film layer provided between the metal layer and the plastic layer,
   wherein the thin film layer includes (i) a silane coupling agent at an amount of 95 to 99 weight %, and (ii) a phenoxy-based resin at an amount of 1 to 5 weight % based on a total weight of the thin film layer,
   wherein the silane coupling agent is at least one selected from a group consisting of 6-[[3-(triethoxysilyl)propyl] amino]-1,3,5-triazine-2,4-dithiol monosodium (TES) and tetramethoxy silane,
   wherein the metal layer and the plastic layer are bonded to each other by a covalent bond with the silane coupling agent.

2. The metal-plastic composite material of claim 1, wherein a material of the metal layer is an electric galvanized steel sheet or a hot-dip galvanized steel sheet.

3. The metal-plastic composite material of claim 1, wherein the plastic layer includes one or more polymers selected from a group consisting of polyamide, polyacetal, polycarbonate, polyphenylene oxide, polyethylene, polypropylene, polyester and polyurethane.

4. The metal-plastic composite material of claim 1, wherein a ratio of a thickness between the plastic layer and the metal layer is 3:1 to 1:5.

5. The metal-plastic composite material of claim 1, wherein the thin film layer has a thickness of 1 nm or more to less than 1000 nm.

6. The metal-plastic composite material of claim 1, wherein the covalent bond is a carbon-carbon bond, a siloxane bond, an amide bond, an ester bond, or an ether bond.

7. The metal-plastic composite material of claim 1, wherein the metal-plastic composite material has a metal layer formed on both surfaces of the plastic layer.

8. A method of manufacturing the metal-plastic composite material of claim 1, the method comprising:
   forming the thin film layer on one surface or both surfaces of the metal layer; laminating the plastic layer on the thin film layer; and
   bonding the metal-plastic laminated material by applying heat and pressure thereto.

9. The method of claim 8, wherein the silane coupling agent and the metal layer and the silane coupling agent and the plastic layer form a covalent bond by the bonding the metal-plastic laminated material by applying heat and pressure thereto.

10. The method of claim 9, wherein the covalent bond is a carbon-carbon bond, a siloxane bond, an amide bond, an ester bond, or an ether bond.

11. The method of claim 8, wherein the bonding step is performed at a temperature of 80 to 280° C.

12. The method of claim 8, wherein thin film layer has a thickness of 1 nm or more to less than 1000 nm.

\* \* \* \* \*